United States Patent [19]
Uzgiris

[11] 3,897,326
[45] July 29, 1975

[54] PROTEIN COATED ELECTRODE

[75] Inventor: Egidijus E. Uzgiris, Schenectady, N.Y.

[73] Assignee: The United States of America as represented by the Secretary of Health, Education, and Welfare, Washington, D.C.

[22] Filed: Aug. 16, 1974

[21] Appl. No.: 498,281

[52] U.S. Cl........ 204/299; 204/180 R; 204/180 G; 204/290 R
[51] Int. Cl............................................ B01k 5/00
[58] Field of Search............ 204/180 R, 180 G, 299

[56] References Cited
UNITED STATES PATENTS
2,898,279   8/1959   Metcalfe et al..................... 204/181
3,556,969   1/1971   Mizuguchi et al.......... 204/180 R X Primary Examiner—John H. Mack
Assistant Examiner—A. C. Prescott

[57] ABSTRACT

A protein coated electrode for use in studies of electrokinetic phenomena is disclosed. The electrode includes a platinized platinum base material having applied thereto a coating of a protein material, bovine serum albumin. The protein coated electrode is particularly useful in the study of electrokinetic phenomena by the technique of laser Doppler spectroscopy.

6 Claims, 1 Drawing Figure

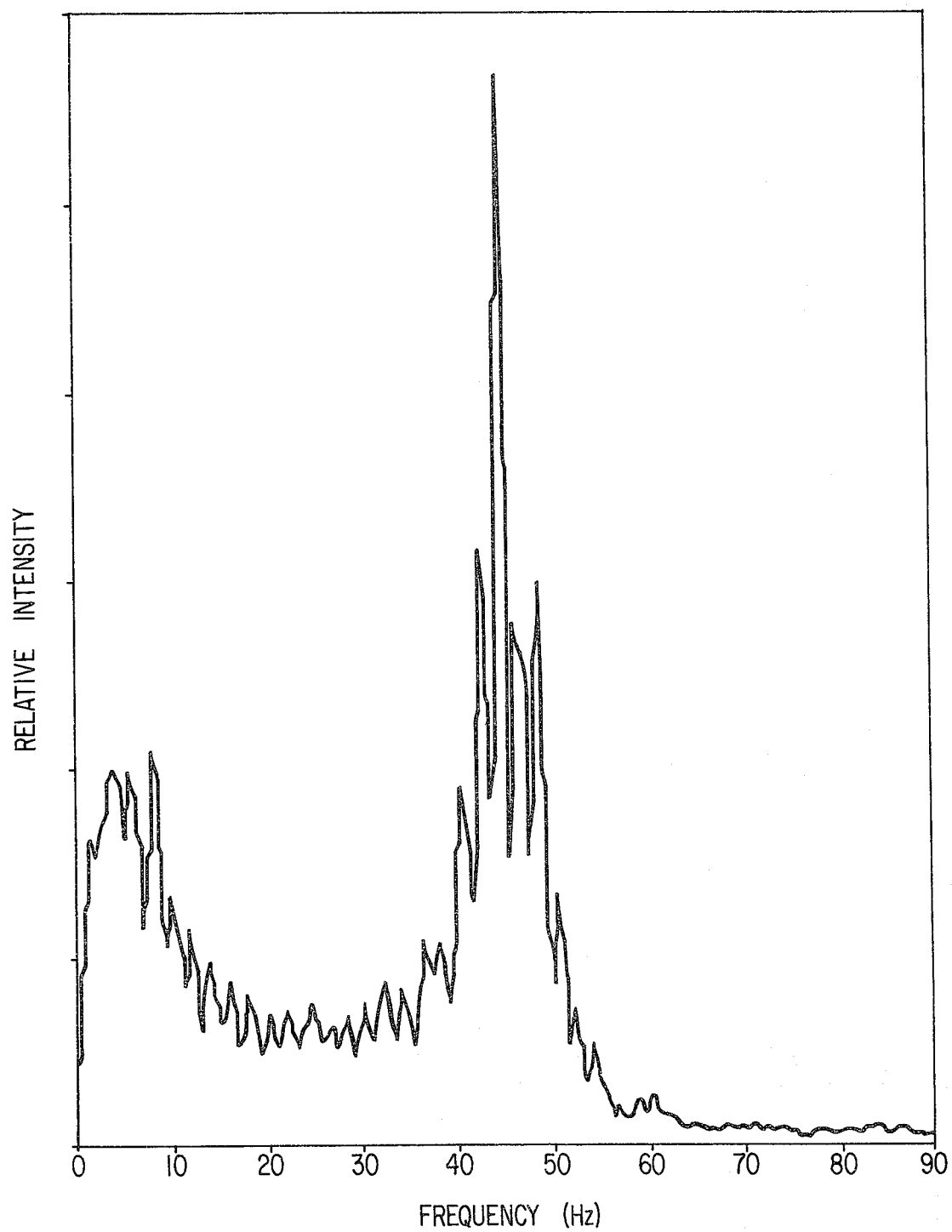

PROTEIN COATED ELECTRODE

BACKGROUND AND SUMMARY OF THE INVENTION

The present invention relates to a protein coated electrode. More particularly, the present invention relates to a platinized platinum electrode coated with the protein material, bovine serum albumin. Such coated electrodes have been found to be particularly useful in the study of electrokinetic phenomena by the technique of laser Doppler spectroscopy.

Measurements of electrokinetic phenomena generally require the application of an electric field to a conducting solution for a substantial period of time, since such fields are usually either of low frequency or direct current. The exposure of a metal electrode surface to the electrolyte solution for such lengthy time periods may, in some cases, lead to specific surface reactions which are detrimental to the measurements of interest. For example, the use of platinized platinum electrodes may result in solute adsorption by the electrode surface, as well as catalytic oxidation of organic compounds. Specific difficulties encountered with application of such electrodes to a sucrose buffer are described hereinafter.

Electrodes formed of platinized platinum have excellent electrode characteristics for studies of electrokinetic phenomena, these characteristics including: (1) large surface area and large surface capacitance; (2) low electrode polarization; and (3) a physically stable surface. Such features make platinized platinum superior to other common electrode materials for electrokinetic measurements by the technique of laser Doppler spectroscopy.

By the term platinized platinum electrode as used herein is intended an electrode wherein a platinum base has been "platinized" with an outer layer of finely divided platinum black. Such platinization may be carried out by electrodeposition, employing a solution of chloroplatinic acid and lead acetate, for example, as described by Glasstone, S. *An Introduction to Electrochemistry*, 35 (1946).

An example of the way in which electrode surface reactivity has led to difficulties in electrophoretic mobility measurements is seen in studies which have been undertaken with regard to the electric surface properties of lymphocytes and erythrocytes by laser Doppler spectroscopy. Such an investigation involves a study of the spectrum of scattered light when an electric field is applied to a solution containing the cells. The Doppler shift of the scattered light has been found to be proportional to the product of the mobility and the electric field amplitude for a given scattering angle. Thus, upon application of an electric field, the detected photocurrent spectral peak at the origin of the frequency scale is shifted from the origin to a new frequency position determined by the Doppler shift of the scattered light. For an ideal system, this peak is of Lorentzian shape of width at half maximum equal to $DK^2/\pi$, where D is a diffusion constant and K is the scattering wave vector. Thus accurate mobility measurements can be made on a very large number of cells simultaneously.

To avoid heating and electrode polarization problems, it is preferable to employ low ionic strength solutions. For example, an isotonic aqueous solution of 0.290 M sucrose having 0.005 $\mu$ ionic strength has been advantageously employed. The lymphotcytes and erythrocytes seem to survive quite well in this buffer solution. Typically, only a small number of cells seem to be morphologically altered after 3 hours in the buffer solution.

When platinized platinum electrodes are immersed into such a solution and an electric field is applied, there is initially observed a sharp Doppler shifted peak in the spectrum of the photocurrent. However, within a few minutes this peak becomes broadened and its position from the origin decreases. Finally, after 5 to 10 minutes, the peak is quite broad and located nearly at the origin. Upon flushing out the electrodes with distilled $H_2O$, there is once again regained the sharp peak in its original position. After a short time, the peak again decays to the origin. A similar phenomena was observed for a suspension of polystyrene spheres in this same type of buffer. These observations illustrate a type of surface reaction between the electrode and the buffer solution which destroys the possibility of making reliable and accurate electrophoretic mobility measurements.

By the present invention, there is provided a novel coated electrode which has been found to overcome the disadvantages of prior platinum electrodes as previously described. The electrode of the present invention includes a platinized platinum base material which is coated with the protein material, bovine serum albumin. Such a coated electrode has been found to provide sharp spectral peaks in electrokinetic studies, with such peaks remaining unchanged for long periods, indicating that the surface effect problems have been effectively overcome. Thus the reactivity problems associated with the uncoated platinized platinum electrode are avoided, while the superior electrical and physical properties of the platinized platinum material are retained.

BRIEF DESCRIPTION OF THE DRAWING

The advantages and features of the protein coated electrode of the present invention will be more clearly understood from the following detailed description of the preferred embodiments, taken in conjunction with the accompanying drawing, wherein:

the sole FIGURE of the drawing provides a graph showing the spectral peak obtained with a platinized platinum electrode coated with bovine serum albumin, in accordance with the present invention.

DESCRIPTION OF THE PREFERRED EMBODIMENTS

In the preparation of the protein coated electrode of the present invention, platinum electrodes which have been platinized by electrodeposition are dipped into a 10 percent aqueous solution of bovine serum albumin, abbreviated as BSA, for a few minutes and then flushed with water. No difference of current waveform is observed between electrodes thus prepared and untreated platinum black electrodes for a square wave field (5-10 Hz). However, by the use of the protein coated electrode as prepared in accordance with the present invention, the troublesome temporal decay of the Doppler spectrum is now completely eliminated.

The graph in the drawing shows the spectrum of light scattered from lymphocytes in a 0.290 M sucrose buffer of 0.005 $\mu$ ionic strength. The electrodes were coated with BSA by the method previously described. This spectrum was taken at about 30 V/cm and with a scattering angle of 15°. A 15 mw helium-neon laser was employed as the light source. The periodic structure of the spectrum results from the 2 Hz square wave modulation of the applied electric field.

A sharp spectral peak such as shown in the FIGURE of the drawing persists unchanged indefinitely when the protein coated electrodes of the present invention are employed. This stability is observed up to 100 V/cm, the highest field generally employed in these electrokinetic studies. The observed mobilities of lymphocytes and erythrocytes, 2.8 and 3.4 $\mu$/sec/v/cm, respectively, are effectively reproduced from day to day and from different donors by the use of the present coated electrodes. Also, there does not appear to be any long term changes of the electrode performance for periods of up to a month, and after repeated usage. Generally, the electrodes are stored in distilled water when not in use. If film restoration is needed, it can be accomplished by simply dipping the electrode once again in a BSA solution. Since BSA has been found not to adsorb on a BSA-coated material, the nature of the film on the platinum surface will not be changed, even after repeated dippings in the protein solution.

The protein material, bovine serum albumin, may be prepared by any suitable method, as described, for example, by Giaever, I. *J. of Immunology*, 110, 1424 (1973).

The protein material, BSA, will adsorb onto the platinum surface over a wide range of solute conditions. The protein coating adsorbed out of solution onto the platinum surface is quite thin, on the order of 30 A or less, and the coating is bound firmly enough for extended use of the electrodes. Surface binding may be broken by the presence of acid or phosphate in sufficient concentration. Thus there is formed on the platinum electrodes a protein layer of sufficient porosity and thinness so as not to affect the electrical properties of the electrode, but which will inhibit the type of troublesome reaction previously described.

It is thought that the invention and many of its attendant advantages will be understood from the foregoing description, and it will be apparent that various changes may be made in the protein coated electrode of the present invention without departing from the spirit and scope of the invention or sacrificing its material advantages, the forms hereinbefore described being merely preferred embodiments thereof.

It is claimed:

1. An electrode for use in measuring electrokinetic phenomena, said electrode comprising platinized platinum coated with bovine serum albumin.

2. The electrode of claim 1, wherein the thickness of the coating of bovine serum albumin is 30 A or less.

3. In a method for the measurement of electrokinetic phenomena employing a system of electrodes immersed in an electrolyte, the improvement comprising the use as an electrode of platinized platinum coated with bovine serum albumin.

4. The method of claim 3, wherein said measurements of electrokinetic phenomena include the technique of laser Doppler spectroscopy.

5. The method of claim 3, wherein said electrolyte comprises an aqueous solution of sucrose.

6. The method of claim 3, wherein the thickness of the coating of bovine serum albumin is 30 A or less.

* * * * *